(12) United States Patent
Wassermann et al.

(10) Patent No.: US 8,302,080 B2
(45) Date of Patent: Oct. 30, 2012

(54) AUTOMATED TEST INPUT GENERATION FOR WEB APPLICATIONS

(75) Inventors: Gary Wassermann, Davis, CA (US);
Dachuan Yu, Foster City, CA (US);
Ajay Chander, San Francisco, CA (US);
Dinakar Dhurjati, Sunnyvale, CA (US);
Hiroshi Inamura, Cupertino, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1025 days.

(21) Appl. No.: 12/249,646

(22) Filed: Oct. 10, 2008

(65) Prior Publication Data
US 2009/0125976 A1 May 14, 2009

Related U.S. Application Data

(60) Provisional application No. 60/986,552, filed on Nov. 8, 2007.

(51) Int. Cl.
*G06F 9/44* (2006.01)
(52) U.S. Cl. .......................... 717/131; 717/142; 717/154
(58) Field of Classification Search .......... 717/101–178; 714/1–824; 709/223; 716/106
See application file for complete search history.

(56) References Cited

U.S. PATENT DOCUMENTS

| | | | | |
|---|---|---|---|---|
| 5,761,408 A * | 6/1998 | Kolawa et al. | ............... | 714/38.1 |
| 5,784,553 A * | 7/1998 | Kolawa et al. | ............... | 714/38.1 |
| 7,290,194 B2 * | 10/2007 | Gabrielson et al. | ............ | 714/742 |
| 7,444,622 B2 * | 10/2008 | Grieskamp et al. | ............ | 717/124 |
| 7,496,791 B2 * | 2/2009 | Tillmann et al. | ................. | 714/25 |
| 7,584,455 B2 * | 9/2009 | Ball | ............................. | 717/124 |
| 7,587,636 B2 * | 9/2009 | Tillmann et al. | ................. | 714/33 |
| 7,684,892 B2 * | 3/2010 | Yuan et al. | ..................... | 700/181 |
| 7,797,687 B2 * | 9/2010 | Tillmann et al. | ............... | 717/131 |
| 8,046,746 B2 * | 10/2011 | Tillmann et al. | ............... | 717/133 |
| 2004/0103396 A1 * | 5/2004 | Nehab | ............................ | 717/127 |
| 2004/0117772 A1 * | 6/2004 | Brand et al. | ................... | 717/132 |
| 2004/0243951 A1 * | 12/2004 | Hall | ................................... | 716/4 |
| 2005/0038881 A1 * | 2/2005 | Ben-Itzhak | .................... | 709/223 |
| 2006/0225026 A1 * | 10/2006 | Henaire et al. | ................. | 717/100 |
| 2006/0253739 A1 * | 11/2006 | Godefroid et al. | .............. | 714/38 |
| 2007/0033440 A1 * | 2/2007 | Tillmann et al. | ................. | 714/38 |

(Continued)

OTHER PUBLICATIONS

"Hybrid Concolic Testing" Majumdar, R.; Sen, K. Software Engineering, 2007. ICSE 2007- Jun. 4, 2007.*

(Continued)

*Primary Examiner* — Lewis A Bullock, Jr.
*Assistant Examiner* — Francisco Aponte
(74) *Attorney, Agent, or Firm* — Blakely, Sokoloff, Taylor & Zafman LLP

(57) ABSTRACT

A method and apparatus is disclosed herein for automated test input generation for web applications. In one embodiment, the method comprises performing a source-to-source transformation of the program; performing interpretation on the program based on a set of test input values; symbolically executing the program; recording a symbolic constraint for each of one or more conditional expressions encountered during execution of the program, including analyzing a string operation in the program to identify one or more possible execution paths, and generating symbolic inputs representing values of variables in each of the conditional expressions as a numeric expression and a string constraint including generating constraints on string values by modeling string operations using finite state transducers (FSTs) and supplying values from the program's execution in place of intractable sub-expressions; and generating new inputs to drive the program during a subsequent iteration based on results of solving the recorded string constraints.

25 Claims, 9 Drawing Sheets

U.S. PATENT DOCUMENTS

| | | | |
|---|---|---|---|
| 2007/0033576 A1* | 2/2007 | Tillmann et al. | 717/124 |
| 2007/0156644 A1* | 7/2007 | Johnson et al. | 707/2 |
| 2007/0157180 A1* | 7/2007 | Tillmann et al. | 717/140 |
| 2007/0244942 A1* | 10/2007 | McCamant et al. | 707/206 |
| 2008/0092119 A1* | 4/2008 | Sweis | 717/124 |
| 2008/0250051 A1* | 10/2008 | Grechanik et al. | 707/102 |

OTHER PUBLICATIONS

Benedikt, M., et al., "Veriweb: Automatically testing dynamic web sites", In Proc. WWW, 2002.
T.S. BV., "Tiobe programming community index", Sep. 2007, accessed at http://www.tiobe.com/tpci.htm.
Cadar, C., et al., "Execution generated test cases: How to make system code crash itself", In Proc. SPIN., pp. 2-23, 2005.
Cadar, C., et al., "Exe: automatically generating inputs of death", In Proc. CCS, pp. 322-335, 2006.
Csallner, C., et al., "Jcrasher: an automatic robustness tester for java", Softw., Pract. Exper., pp. 1025-1050, 2004.
Emmi, M., et al., "Dynamic test inpout generation for database applications", In Proc. ISSTA, 2007.
Futoransky, A., et al., "A dynamic technique for enhancing the security and privacy of web applications", In Proc. Black Hat USA, 2007.
Gulavani, B.S., et al., "Synergy: a new algorithm for property checking", In Proc. FSE, pp. 117-127, 2006.
Halfond, W.G., et al., "Improving test case generation for web applications using automated interface discovery", In Proc. ESEC/FSE, 2007.
Hopcraft, J.E., et al., "Introduction to Automata Theory, Languages, and Computability", Addison-Wesley, Boston, MA, 2000.
Jia, X., et al., "Rigorous and automatic testing of web applications", 2002.
Jovanovic, N., et al., "Pixy: A static analysis tool for detecting web application vulnerabilities (short paper)", In Proc. S&P, 2006.
Kunc, M., "What do we know about language equations?", In Proc. DLT, 2007.
Kung, D., et al., "An object-oriented web test model for testing web applications", In Proc. COMPSAC, pp. 537-542, 2000.
Lei, Y., et al., "Minimization of randomized unit test cases", In Proc. ISSRE, pp. 267-276, 2005.
Li, J.J., et al., "Code-coverage guided prioritized test generation", Inf. Softw. Technol., pp. 1187-1198, 2006.
Minamide, Y., "Static approximation of dynamically generated web pages", In Proc. WWW, 2005.
Nethercote, N., et al., "Valgrind: a framework for heavyweight dynamic binary instrumentation", Proc. PLDI, pp. 89-100, 2007.
Nguyen-Tuong, A., et al., "Automatically hardening web applications using precise tainting", In Twentieth IFIP International Information Security Conference (SEC '05), 2005.
Pacheco, C., et al., "Eclat: Automatic generation and classification of test inputs", In Proc. ECOOP, pp. 504-527, 2005.
Plandowski, W., "Satisifiability of word equations with constants is in pspace", In Proc. FOCS, 1999.
Reps, T., et al., "Precise interprocedural dataflow analysis via graph reachability", In Proc. POPL, 1995.
Ricca. F., et al., "Analysis and testing of web applications", In Proc. ICSE, pp. 25-34, 2001.
Sen, K., et al., "Cute and jcute: Concolic unit testing and explicit path model-checking tools", In Proc. CAV, 2006.
Sen, K., et al., "Cute: a concolic unit testing engine for c", In Proc. ESEC/FSE, 2005.
Su, Z., et al., "The essence of command injection attacks in web applications", In Proc. POPL, 2006.
Wasserman, G., et al., "Sound and Precise Analysis of Web Applications for Injection Vulnerabilities", In Proc. PLDI, 2007.
Xie, Y., et al., "Static detection of security vulnerabilities in scripting languages", In Proc. USENIX Security Symposium, 2006.
International Preliminary Search on Patentability for corresponding PCT Patent Application No. PCT/US2008/082286, May 20, 2010, 8 pgs.
Inkumsah, Kobi, et al., "Evacon: A Framework for Integrating Evolutionary and Concolic Testing for Object-Oriented Programs", Proceedings of the Twenty-Second IEEE/ACM International Conference on Automated Software Engineering, Nov. 9, 2007, pp. 425-428, Atlanta, Georgia, USA.
Artzi, Shay, et al., "Finding Bugs in Dynamic Web Applications", Proceedings of the 2008 International Symposium on Software Testing and Analysis, Jul. 2008, pp. 261-271, Seattle, Washington, USA.
PCT International Search Report for PCT Application No. PCT/US2008/082286, dated Aug. 6, 2009, 7 Pages.
PCT Written Opinion of the International Searching Authority for PCT Application No. PCT/US2008/082286, dated Aug. 6, 2009, 8 Pages.

\* cited by examiner

FCOMPOSE($F_1, F_2$)
1  // also written $F_1 \circ F_2$
2  $(Q_1, \Sigma, s_1, f_1, \Delta_1, L_1) \leftarrow F_1$
3  $(Q_2, \Sigma, s_2, f_2, \Delta_2, L_2) \leftarrow F_2$
4  $\Delta \leftarrow \emptyset; Q \leftarrow \emptyset; L \leftarrow \emptyset$
5  $\Delta_1' \leftarrow \Delta_1; \Delta_2' \leftarrow \Delta_2$
6  for each $q \in Q_1$
7  do $\Delta_1' \leftarrow \Delta_1' \cup \{(q, e, e, q)\}$
8  for each $q \in Q_2$
9  do $\Delta_2' \leftarrow \Delta_2' \cup \{(q, e, e, q)\}$
10 for each $(q_{s1}, i, m, q_{t1})$ in $\Delta_1'$
11 do for each $(q_{s2}, m, o, q_{t2})$ in $\Delta_2'$
12    do $\Delta \leftarrow \Delta \cup \{((q_{s1}, q_{s2}), i, o, (q_{t1}, q_{t2}))\}$
13 for each $q_1$ in $Q_1$
14 do for each $q_2$ in $Q_2$
15    do $Q \leftarrow Q \cup \{(q_1, q_2)\}$
16    if $q_2 \in$ domain $(L_2)$
17       then $L \leftarrow L \cup \{(q_1, q_2)\} \leftarrow L_2(q_2)\}$
18 $(Q, \Sigma, (s_1, s_2), (f_1, f_2), \Delta, L)$

FIG. 1 FST Composition Algorithm

FIMAGE($A, F$)
1  // also written $F(A)$
2  $(Q_1, \Sigma, s_1, f_1, \Delta_1, L_1) \leftarrow A$
3  $(Q_2, \Sigma, s_2, f_2, \Delta_2, L_2) \leftarrow F$
4  $\Delta \leftarrow \emptyset; Q \leftarrow \emptyset; L \leftarrow \emptyset$
5  $\Delta_1' \leftarrow \Delta_1; \Delta_2' \leftarrow \Delta_2$
6  for each $q \in Q_1$
7  do $\Delta_1' \leftarrow \Delta_1' \cup \{(q, e, q)\}$
8  for each $q \in Q_2$
9  do $\Delta_2' \leftarrow \Delta_2' \cup \{(q, e, e, q)\}$
10 for each $(q_{s1}, i, q_{t1})$ in $\Delta_1'$
11 do for each $(q_{s2}, i, o, q_{t2})$ in $\Delta_2'$
12    do if not $(q_{s1} \in$ domain $(L_1)$ and $q_{s2} \in$ domain $(L_2))$
13       then $\Delta \leftarrow \Delta \cup \{((q_{s1}, q_{s2}), o, (q_{t1}, q_{t2}))\}$
14 for each $q_1$ in $Q_1$
15 do for each $q_2$ in $Q_2$
16    do $Q \leftarrow Q \cup \{(q_1, q_2)\}$
17    if $q_2 \in$ domain $(L_2)$
18       then $L \leftarrow L \cup \{(q_1, q_2)\} \leftarrow L_2(q_2)\}$
19 $(Q, \Sigma, (s_1, s_2), (f_1, f_2), \Delta, L)$

FIG. 2 FSA Image Construction

FCONCATENATE($F_1, F_2$)
1  // also written $F_1, F_2$
2  $(Q_1, \Sigma, s_1, f_1, \delta_1, L_1) \leftarrow F_1$
3  $(Q_2, \Sigma, s_2, f_2, \delta_2, L_2) \leftarrow F_2$
4  $\delta \leftarrow \delta_1 \cup \delta_2 \cup \{(f_1, e, e, s_2)\} Q \leftarrow Q_1 \cup Q_2$
5  $L \leftarrow L_1 \cup L_2$
6  $(Q, \Sigma, s_1, f_2, \delta, L)$

FIG. 3 FST Concatenation Algorithm

FINVERT($F$)
1  // also written $F^{-1}$
2  $(Q_1, \Sigma, s, f, \delta, L) \leftarrow F$
3  $\delta' \leftarrow \{\}$
4  for each $(q_1, i, o, q_2)$ in $\delta$
5  do $L \leftarrow \delta' \leftarrow \delta' \cup \{(q_1, o, i, q_2)\}$
6  $(Q, \Sigma, s, f, \delta', L)$

FIG. 4 FST Inversion Algorithm

| | | |
|---|---|---|
| $e$ | =:: | $e$ bin_op $e$ \| $c$ \| (cast) $e$ |
| | | \| $f(e,...)$ \| $e[e]$ \| $\square$ |
| bin_op | =:: | str_op \| num_op \| bool_op |
| $f$ | =:: | str_f \| num_f \| bool_f \| arr_f |
| str_op | =:: | . (concatenation) |
| str_f | =:: | trim \| add_slashes \| implode \| preg_replace \| |
| num_op | =:: | + \| − \| $\square$ \| $\square$ \| % |
| num_f | =:: | count \| strlen \| ... |
| bool_op | =:: | = \| ≠ \| > \| ≥ \| < \| ≤ |
| bool_f | =:: | isset \| is_int \| ereg \| ... |
| arr_f | =:: | expode \| split \| array_combine \| ... |
| cast | =:: | int \| float \| string \| bool \| array |

FIG. 5 Expression Language

BOUND (t)
1  switch t
2    case □ :
3      return (true , t)
4    case c :
5      return (false , GETCONCRETE(t))
6    case (cast) e :
7      $b_1, t_1$   BOUND(e)
8      if $b_1$
9        then return (true , t)
10       else return (false , GETCONCRETE(t))
11   case $e_1$ bin_op $e_2$ :
12     $b_1, t_1$   BOUND($e_1$)
13     $b_2, t_2$   BOUND($e_2$)
14     if $b_1$ and $b_2$
15       then return (true , $t_1$ bin_op $t_2$)
16       else return (false , GETCONCRETE(t))
17   case $e_1 [e_2]$ :
18     $b_1, t_1$   BOUND($e_1$)
19     $b_2, t_2$   BOUND($e_2$)
20     if $b_1$ and $b_2$
21       then return (true , $t_1 [t_2]$)
22       else return (false , GETCONCRETE(t))
23   case f (args list) :
24     t_args    [ ]
25     b    false
26     for each t in args
27     do $b_1, t_1$   BOUND(t)
28        b    b or $b_1$
29        t_args    $t_1$ :: t_args
30     if b
31       then return (true , f(t_args))
32       else return (false , GETCONCRETE(t))

FIG. 6  Algorithm To Replace Constant Expressions With Concrete Values

INVERT ($e$)
1  switch $e$
2    case $c$ :
3       □   {}
4       $q_b$   $q_s$   FRESHSTATE( )
5       $Q$   $\{q_s\}$
6       for i   0 to LENGTH ($c_s$) – 1
7       do $q_t$   FRESHSTATE( )
8          □   □ □ ($q_b$, $c_e[i]$, $e$, $q_t$)
9          $Q$   $Q$ □ $\{q_t\}$
10         $q_b$   $q_t$
11      return ($Q$, □, $q_s$, $q_t$, □, { } )
12   case □ :
13      □   {}
14      $q$   FRESHSTATE( )
15      for each $a$ in □
16      do □ = □ □ {($q$, $a$, $a$, $q$)}
17         $L$   {($q$   (□$_a$, FRESHLABEL( )))}
18      return ({$q$}, □, $q$, $q$, □, $L$ )
19   case $e_1$, $e_2$ :
20      return (INVERT ($e_1$), (INVERT ($e_2$))
21   case $f$(args) :
22      switch $f_e$
23         case trim :
24            return ($F^{-1}_{\text{trim}}$ ○ INVERT ($args[0]$))
25         case addslashes :
26            return ($F^{-1}_{\text{addslashes}}$ ○ INVERT ($args[0]$))
27         case ... :

FIG. 7   String Operation Inversion

| □(•) | =:: | • □ $\mathcal{L}$ | $\mathcal{L}$ is a regular language |
| | \| | • $op$ $i$ | integer |
| | \| | • $op$ $f$ | float |
| | \| | • = $b$ | boolean |
| | \| | □(•$[index]$) | constraint on array element |
| | \| | \| • \| $op$ $i$ | constraint on array length |
| $index$ | =:: | i | integer index |
| | \| | s | string index |
| | \| | ⊤ | unknown index |
| $op$ | =:: | = \| ≠ \| > \| ≥ \| < \| ≤ | |

FIG. 8   Intermediate Constraints

SOLVE (□, e)
1   switch □
2      case • □ L :
3         F  INVERT(e)
4         V □ F(L)

FIG. 9  Univariate String Constraint Resolution Algorithm user.php

```
10   isset ($_GET[□userid□]) ?
11      $userid = $_GET[□userid□] : $userid = □□;
12   if ($USER[□groupid□] ! = 1)
13   {
14      / / permission denied
15      unp_msg($gp_permserror);
16      exit ;
17   }
18   if ($userid == □□)
19   {
20      unp_msg($gp_invalidrequest);
21      exit ;
22   }
23   $userid = □□0□□ $userid;
24   if (!eregi(□□0[0-9] +□ $userid))
25   {
26      unp-msg(□You entered an invalid user ID. □) ;
27      exit ;
28   }
29   $getuser = $DB   query (□□$ELECT * FROM□□
30      , □□□unp user□WHERE userid=□userid□□) ;
31   if (!$DB   is_single_row ($getuser))
32   {
33      unp_msg (□You entered an invalid user ID.□) ;
34      exit ;
35   }
36   ...
```

FIG. 11   Example PHP Code

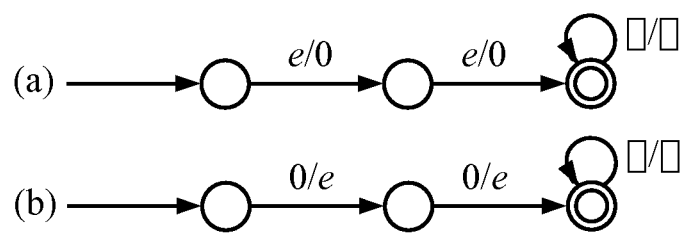

FIG. 12   An FST Representation Of Concatenating □□0□□ To Another String, And The FST's Inverse; □ □ □

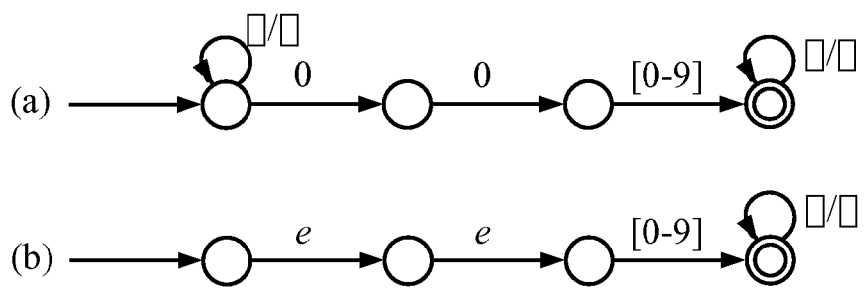
FIG. 13 An FSA Representation Of The ereg ▯▯0 [0-9] + ▯▯And Its Image Over The FST In Figure 12b; ▯ ▯ ▯

AUTOMATED TEST INPUT GENERATION
FOR WEB APPLICATIONS

PRIORITY

The present patent application claims priority to and incorporates by reference the corresponding provisional patent application Ser. No. 60/986,552, titled, "Automated Test Input Generation for Web Applications," filed on Nov. 8, 2007.

FIELD OF THE INVENTION

The present invention relates to the field of analysis of computer programs; more particularly, the present invention is related to generating test inputs based on symbolic constraints and concrete values gathered from executions of the program.

BACKGROUND OF THE INVENTION

Web applications continue to offer more features, handle more sensitive data, and generate content dynamically based on more sources as users increasingly rely on them for daily activities. The increased role of web applications in important domains, coupled with their interactions not only with other web applications but also with users' local systems exacerbates the effects of bugs and raises the need for correctness.

Testing is a widely used approach for identifying bugs and for providing concrete inputs and traces that developers use for fixing bugs. However, manual testing requires extensive human effort, which comes at significant cost. Additionally, quality assurance (QA) testing usually attempts to ensure that the software can do everything it ought to do, but it does not check whether the software can do things it ought not to do; such functionality usually constitutes security holes.

Traditional work on testing has generated random values as inputs. Randomly generated input values will often be redundant and will often miss certain program behaviors entirely. Test input generation that leverages runtime values, or concolic testing, has been pursued by multiple groups. These approaches gather both symbolic constraints and concrete values from program executions, and use the concrete values to help resolve the constraints to generate the next input. Previous work on concolic testing handles primarily constraints on numbers, pointer-based data structures, and thread interleaving. This is appropriate for the style of programming that languages like C and Java encourage, but scripting languages, especially when used in the context of web applications, encourage a style in which strings and associative arrays play a more central role.

Others have augmented concolic testing to analyze database-backed Java programs, including support for string equality and inclusion in regular languages specified by SQL LIKE predicates. They support a form of multi-lingual programming in which Java programs generate SQL queries. However, this approach does not support any string operations. They check for the same properties as standard concolic checkings.

Thus, previous work on concolic testing has helped to automate test input generation for desktop applications written in C or Java, but web applications written in scripting languages such as PHP pose different challenges.

First, PHP is a scripting language and not a compiled language. Such languages, especially in the context of web applications, encourage a style of programming that is more string- and array-centric as opposed to languages like Java where numeric values and data structures play a more central role. In the limit, scripting languages allow for arbitrary metaprogramming, although most PHP programs only make moderate use of dynamic features. Additionally, PHP web applications receive all user input in the form of strings, and many string manipulation and transformation functions may be applied to these values.

Second, in order for automatic test input generation to be useful, test oracles are needed that will identify when common classes of errors have occurred. Several common classes of errors in C programs are memory errors; Java has eliminated most memory errors, but Java programs may still have null-pointer dereference errors; and PHP programs are entirely free of memory corruption errors (barring bugs in the interpreter). Hence, other kinds of test oracles are needed.

Some previous work on web application testing has focused on static webpages and the loosely structured control flow between them (defined by links), and other work has focused on the server-side code, often carrying over techniques from traditional testing. Early work on web applications focused primarily on static pages and the coverage metric was page-coverage.

Other testing techniques that attempt to test the effects of input values on web applications, but they require interface specifications and cannot guarantee code coverage without extensive user interaction. In some cases, automated techniques derive the interface specifications and in others developers must provide them, but either way, the testing system essentially performs fuzz testing that may be constrained by user-provided value specifications. Other testing mechanisms provide more reliable code coverage, but they repeatedly prompt the user for new inputs, so they sacrifice automation.

Static analysis of web applications has been performed. However, those that have been proposed do no consider dynamically constructed string values, and thus, they can only check whether raw user inputs flow into sensitive sinks.

All of the techniques known to the inventors have limited effectiveness, because PHP supports dynamic features, in which the runtime system interprets data values as code, and dynamic features inhibit static analysis. The standard dynamic features PHP provides allow string values to specify: the name of a file to include, the name of a variable to read/write, the name of a method to invoke, the name of a class to instantiate, and the string representation of code to execute. All of the static analyses for PHP described above either fail on dynamic features, treat them optimistically (i.e., ignore them), ask the user to provide a value for each one, or do some combination of the three. Many PHP applications use dynamic features extensively, for example, to implement dynamic dispatch for dynamically loaded modules or for database handling code. On such code, static analysis fails to produce useful results.

In most real-world PHP programs, however, the values of interpreted strings come only from trusted values such as constant strings within the PHP code, for example in a factory pattern; column names from a known database schema; or field names from a protected configuration file. In such cases, the values of interpreted strings depend only indirectly on user input, and for any given run, the predicates on user inputs are not dynamically constructed.

SUMMARY OF THE INVENTION

A method and apparatus is disclosed herein for automated test input generation for web applications. In one embodiment, the method comprises performing a source-to-source transformation of the program; performing interpretation on the program based on a set of test input values; symbolically executing the program; recording a symbolic constraint for each of one or more conditional expressions encountered during execution of the program, including analyzing a string operation in the program to identify one or more possible execution paths, and generating symbolic inputs representing values of variables in each of the conditional expressions as a numeric expression and a string constraint including generating constraints on string values by modeling string operations using finite state transducers (FSTs) and supplying values from the program's execution in place of intractable sub-expressions; and generating new inputs to drive the program during a subsequent iteration based on results of solving the recorded string constraints.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates one embodiment of a FST composition algorithm.

FIG. 2 illustrates exemplary FSA image construction.

FIG. 3 illustrates one embodiment of a FST concatenation algorithm.

FIG. 4 illustrates one embodiment of a FST inversion algorithm.

FIG. 5 illustrates exemplary expression language.

FIG. 6 illustrates one embodiment of an algorithm to replace constant expressions with concrete values.

FIG. 7 illustrates string operation inversion.

FIG. 8 illustrates intermediate constraints.

FIG. 9 illustrates one embodiment of an univariate string constraint resolution algorithm.

FIG. 11 illustrates example PHP code.

FIGS. 12A and B illustrate an example of an FST representation.

FIGS. 13A and B illustrate another example of an FST representation

DETAILED DESCRIPTION OF THE PRESENT INVENTION

Figure 10B:
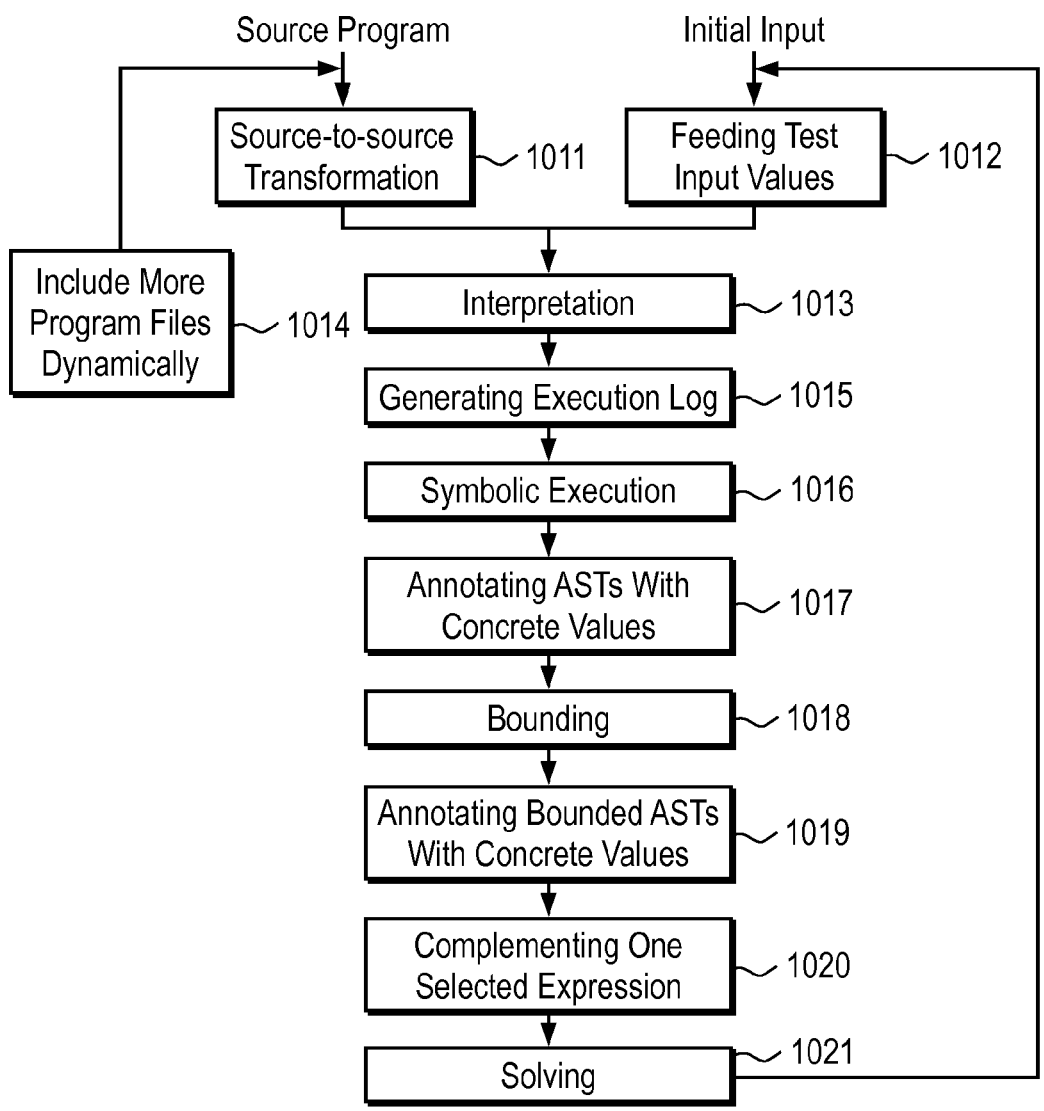
FIG. 10B is a flow diagram of another embodiment of a process for generating test input.

Methods and apparatuses for generating input strings based on symbolic constraints and concrete values gathered from program executions are disclosed. In one embodiment, test cases for applications are automatically generated that cover string- and array-centric operations and achieve a designated code-coverage metric: branch coverage or (bounded) path coverage. In one embodiment, library string functions are represented as finite state transducers (FSTs), and constraints on strings include equality and inclusion constraints. These FSTs can be composed and inverted to solve for input variables. When constraints cannot be represented precisely using finite state transducers concrete values can be used to construct approximations that are finite state transducers. In one embodiment, as part of the test input generation process, a process is used to check string values against existing policies to prevent SQL injection attacks and cross-site scripting. In one embodiment, the test input generation process is fully automated, does not require an interface specification, handles string operations, detects injection vulnerabilities, and generates test inputs for scripting languages, which may utilize general meta-programming.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transfers data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

In one embodiment, the test input generation process described herein applies concolic testing to web applications (e.g., PHP web applications). To do so, in one embodiment, constraints on string values are generated by modeling string operations using finite state transducers (FSTs) and a constraint resolution algorithm is used that emphasizes string values. In PHP, not only do many library functions take arguments of one type and return values of another, but the runtime system itself readily performs many different dynamic type casts. Consequently, sub-expressions of the constraints that are generated may be over other types including numeric types and arrays. To solve the constraints, FSTs are inverted. The concolic testing framework helps to resolve constraints by supplying values from the program's execution in place of intractable sub-expressions. In the case of numeric constraints, "intractable sub-expressions" generally means non-linear terms. In one embodiment, constraints over multiple variables where sub-expressions have different types become difficult to solve; for such constraints, for each variable in the constraint, that variable is solved for by fixing the others to concrete values.

Figure 10A:
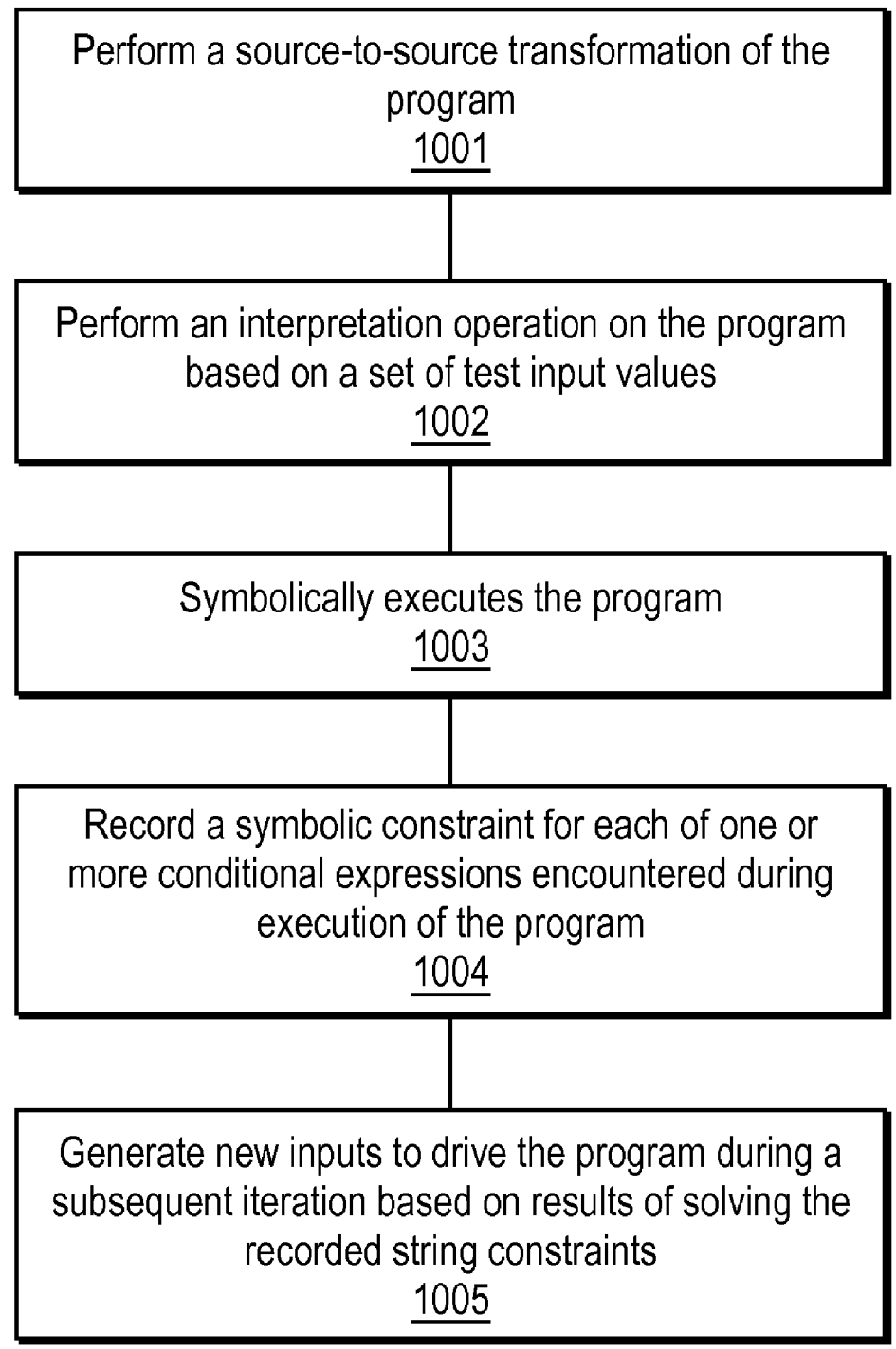
FIG. 10A is a flow diagram of one embodiment of a process for generating test input.

FIG. 10A is a flow diagram of one embodiment of a process for generating test input. The process is performed by processing logic that may comprise hardware (circuitry, dedicated logic, etc.), software (such as is run on a general purpose computer system or a dedicated machine), or a combination of both.

Referring to FIG. 10A, the process begins by processing logic performing a source-to-source transformation of the program (processing block 1001). In one embodiment, the program is written in a scripting language. In one embodiment, the scripting language is part of a web application. In one embodiment, the scripting language is PHP.

After performing the source-to-source transformation, processing logic performs an interpretation operation on the program based on a set of test input values (processing block 1002). In one embodiment, the test inputs are dynamically generated input strings based on symbolic string constraints and concrete values gathered from executions of the program. In one embodiment, the input strings are test cases for applications that cover string- and array-centric operations. In one embodiment, the test cases achieve a designated code-coverage metric. The code-coverage metric is one of a group consisting of: branch coverage and bounded path coverage.

After interpretation, processing logic symbolically executes the program (processing block 1003) and records a symbolic constraint for each of one or more conditional expressions encountered during execution of the program (processing block 1004). In one embodiment, processing logic records a symbolic constraint for each of one or more conditional expressions by analyzing a string operation in the program to identify one or more possible execution paths, and generating symbolic inputs representing values of variables in each of the conditional expressions as a numeric expression and a string constraint including generating constraints on string values by modeling string operations using finite state transducers (FSTs) and supplying values from the program's execution in place of intractable sub-expressions.

In one embodiment, generating symbolic inputs comprises generating a string constraint on one variable in an expression by solving the expression against a constraint. In one embodiment, the FSTs represent library string functions and the method further comprises analyzing string operations in the program using the FSTs. In one embodiment, the method further comprises using the FSTs for solving the constraints for input variables by inverting the FSTs. In one embodiment, modeling string operations using FSTs comprises approximating expressions in the program by considering only one variable occurrence per expression at a time. In one embodiment, at least one symbolic expression is replaced by a concrete value when the one symbolic expression becomes non-linear.

In one embodiment, resolving a symbolic constraint for a conditional expression encountered during execution of the program comprises, for each variable occurrence in a Boolean control expression, creating a copy of the expression and setting all other variable occurrences in the expression to their concrete values from the execution, thereby generating a set of expressions where each expression in the set has only a single variable occurrence and each sub-expression that does not depend on that variable is replaced with its concrete values.

In one embodiment, the method further comprises identifying a point of possible failure in the program and computing approximately a backward slice from the point of failure, and wherein constraints are only recorded from the backward slice.

After recording a symbolic constraint for each of one or more conditional expressions encountered during execution of the program, processing logic generates new inputs to drive the program during a subsequent iteration based on results of solving the recorded string constraints (processing block 1005). In one embodiment, generating, based on analysis of the recorded constraints, new inputs to drive the program during a subsequent iteration comprises selecting from an expression from the list to invert and discarding expressions following the expression in the list.

In one embodiment, the method further comprises checking string values against one or more existing policies to prevent SQL injection attacks. In one embodiment, at least one security policy classifies, as tainted, any SQL query in which characters in tokens are non-literals, and the method includes flagging an error if such a query is identified. In one embodiment, at least one security policy classifies, as tainted, strings in an output document of a web application that invoke a JavaScript interpreter of a client, and the method includes flagging an error if such a string is identified.

Definitions

For the purposes herein, finite state automata and finite state transducers are defined to include a labeling function.

Definition 6.1. Finite State Automaton A finite state automaton (FSA) is a 6-tuple $(Q, \Sigma, q_0, q_f, \delta, L)$ where the first five terms are defined in the standard way, and $L:Q \rightarrow (V \times D)$ is a partial labeling function, where V is a set of program variables and D is a set.

Definition 6.2. Finite State Transducer A finite state transducer (FST) is a 6-tuple $(Q, \Sigma, q_0, q_f, \delta, L)$ where $\delta \subset Q \times (\Sigma \cup \{\epsilon\}) \times (\Sigma \cup \{\epsilon\}) \times Q$, where the first symbol is an input symbol and the second is an output symbol; and the rest of the terms are defined as for an FSA.

Definition 6.3. (Assignment) Let $p = q_0 a \ldots q_i a_i s a_j q_j \ldots q_f$ be a path through an FSA $F = (Q, \Sigma, q_0, q_f, \delta, L)$, let $s = q_a a_l \ldots$ . $a_n q_z$ be a subsequence of p, and let (v, d) be a pair such that for each q in s, $L(q)=(v, d)$, $L(q_i) \neq (v, d)$, and $L(q_j) \neq (v, d)$. Then the projection of s onto $\Sigma$, $a_l \ldots a_n$, is an assignment for v.

FSTs

FIGS. 1, 2, 3, and 4 give algorithms for standard operations with FSTs. More specifically, FIG. 1 illustrates one embodiment of a FST composition algorithm; FIG. 2 illustrates exemplary FSA image construction; FIG. 3 illustrates one embodiment of a FST concatenation algorithm; and FIG. 4 illustrates one embodiment of a FST inversion algorithm.

Referring to FIGS. 1-4, each of the algorithms is presented in such a way that the algorithm carries the labeling on states in the input automata over to the output automaton. In the algorithm for finding the image of an FSA over an FST depicted in FIG. 2, the algorithm does not construct an image transition if both input states are labeled. This maintains the property that each path through the output FSA can be uniquely projected to valuations of program variables. For conciseness and to avoid obscuring the presentation, these FST operations are referred to herein using established shorthands, as specified at line 1 of the algorithms, respectively.

FIG. 5 illustrates one embodiment of a grammar for the Boolean expressions from a PHP-like language, and the grammar implicitly defines the structure of the expressions' abstract syntax trees. Referring to FIG. 5, e is used for expressions, c is used for constants, f is used for functions, and v is used for variables. The grammar includes some representative functions that return values of types string, boolean, and array, as well as values of numeric types. Such functions are well-known in the art and some examples have been included in the grammar. The constraints recorded from the execution of the subject program come from this grammar. Although the grammar does not specify the arity of each function, PHP's runtime system executes only programs in which functions have the correct number of arguments. Since constraints collected from a run of the program are analyzed, the PHP runtime system guarantees that each function will be passed the correct number of arguments.

Using the test input generation process described herein, an execution of the subject program produces several abstract syntax trees (ASTs) of expressions used as conditionals in the program, and these ASTs are annotated with concrete values. Before attempting to solve for the variables in the expression, all subtrees are replaced in each AST if the subtrees are not dependent on variables with the concrete values they assumed at runtime. This avoids having to use some approximations.

FIG. 6 illustrates one embodiment of an algorithm, referred to as Bound, to replace constant expressions with concrete values. Referring to FIG. 6, the algorithm takes an expression tree t and matches it against the possible kinds of expressions (e) in FIG. 5: variables (v), constants (c), casts, binary operations, array references, and function calls. In each case, if all of the sub-expressions are constant, then the entire expression is constant, as the first value in the returned pair indicates, and the expression is replaced by the corresponding concrete value.

FIG. 7 illustrates one embodiment of an algorithm, referred to as Invert, to invert string expressions. That is, the algorithm of FIG. 7 produces an FST that has the opposite effect of the functions, operators, and constants in the expression tree. For each library string function, an FST that models that function's semantics are defined in a manner well-known in the art. These appear in the program as, for example, $F_{trim}$. In one embodiment, each FST that corresponds to a library function has an empty labeling function.

FIG. 8 gives the definition of intermediate constraints that are used as the intermediate constraints in the constraint resolution algorithm.

FIG. 9 is one embodiment of the general structure for a constraint resolution algorithm, focussing on string constraints to give an example. Referring to FIG. 9, the algorithm takes a parameterized constraint and an expression and generates a constraint on variable values.

Finally, in one embodiment, given an FSA $A=(Q, \Sigma, q_0, q_f, \delta, L)$ produced by the algorithm in FIG. 9, a set of possible language assignments are produced as follows ('$\otimes$' represents cross-product):

$$\delta' = \{(q_1, a, q_2) \in \delta | L(q_1) \neq \emptyset \wedge L(q_1) = L(q_2)\}$$

$$A_{(v,d)} = \{(Q, \Sigma, q_1, q_2, \delta', L) | L(q_1) = L(q_2) = (v,d)\}$$

$$A^P = \bigotimes A_{(v,d)} \ (v,d) \in \text{RANGE}(L)$$

$$\text{Assn} = \{A \in A^P | A_i, A_{i+1} \in A \Rightarrow \exists w \in \Sigma^* \ q_{0_{i+1}} \in \delta^*(q_f, w)\}$$

Each $A \in$ Assn represents a possible assignment of variables to FSAs: for each $A \in A$ if $A \in A_{(v,d)}$, then $v \in L(A)$.

There exists an assignment to variables if there exists an A in the Assn for each predicate p, such that for each program variable v, $$\bigcap_{A \in A_{(v,d)}} A \neq \emptyset$$

The techniques described herein include an algorithm to decide whether SQL injection attacks are possible, and if so, to generate input that will cause an attack. Let $F=(Q, \Sigma, q_0, q_f, \delta, L)$ be an FST and $G=(S, \Sigma, V, R)$ be the normalized SQL grammar. Let $\diamond$ be a fresh symbol (i.e., $\diamond \notin \Sigma$). Let $F'=(Q, \Sigma \cup \{\diamond\}, q_0, q_f, \delta')$ where $$\delta' = \begin{cases} (q, \sigma, \sigma', q') | (q, \sigma, \sigma', q') \in \delta \wedge \sigma' \in \Sigma \\ (q, \sigma, \diamond, q') | (q, \sigma, \varepsilon, q') \in \delta \wedge \sigma \in \Sigma \end{cases}$$

Let $G'=(S', \Sigma \cup \{\diamond\}, V', R')=F'(G)$. $L(G')$ is the language of values for the program variable to which $F^{-1}$ was applied. Let $M=\{a, l, r, n, e\}$, where the elements are mnemonics for "all," "left," "right," "none," and "error," respectively. In order to determine whether attacks are possible, a function $H: V \cup \{\diamond\} \rightarrow P(M)$ is used, where H is given by the minimal solution to:

$$H(\diamond)=\{n\} H(v) \supseteq H(v_1) \text{ for } (v \rightarrow v_1) \in R'$$

and for $(v \rightarrow v_l v_r) \in R'$ $$\begin{Bmatrix} a \\ l \\ r \\ n \\ e \end{Bmatrix} \in H(v) \text{ if } \begin{cases} a \in H(v_l) \cap H(v_r) \\ \vee \begin{Bmatrix} l \in H(v_l) \\ a \in H(v_l) \wedge l \in H(v_r) \\ a \in H(v_l) \wedge n \in H(v_r) \end{Bmatrix} \\ \begin{Bmatrix} r \in H(v_r) \\ \vee \begin{Bmatrix} a \in H(v_r) \wedge r \in H(v_l) \\ a \in H(v_r) \wedge n \in H(v_l) \end{Bmatrix} \end{Bmatrix} \\ n \in H(v_l) \cap H(v_r) \\ r \in H(v_l) \wedge l \in H(v_r) \end{cases}$$

If there exists a v ∈ N' such that e ∈ H(v), then according to the symbolic constraints, an attack is possible. In one embodiment, if this is the case, the grammar $G^A=(S', \Sigma, V^A, R^A)$ of all inputs that cause an attack on this path is generated as follows. Let $$V^A = V' \cup \{v^A | e \in H(v) \wedge S' \Rightarrow^*_{G'} v\}$$

and let $$R^A = R'|_{(V' \setminus \{S'\} \to \Sigma)} \cup \{S' \to v^A | v^A \in V^A\}$$

where $R'|_{(V' \setminus \{S'\} \to \Sigma)}$ denotes the projection of R' onto the function space from the domain V' \{S'} to the co-domain Σ. $G^A$ can then be intersected with the regular language constraints on the variable it corresponds to in order to produce the language of values that will likely cause an attack. It is straightforward to find a string in the language of a context-free grammar.

A More Detailed Process Flow

FIG. 10B is a flow diagram of another embodiment of a process for generating test input. The process is performed by processing logic that may comprise hardware (circuitry, dedicated logic, etc.), software (such as is run on a general purpose computer system or a dedicated machine), or a combination of both.

Referring to FIG. 10B, the process begins by processing logic performing a source-to-source transformation on a source program file (e.g., a PHP file) (processing block 1011). In one embodiment, the source-to-source transformation puts the file into 3-address code and wraps statements in function calls that will log execution.

After the source-to-source transformation, processing logic performs an interpretation operation on the transformed program using some test input values (processing block 1012). Processing logic also feeds test inputs values into the interpretation operation to facilitate the operation (processing block 1013). The test input values may be a set of initial input values or test input values generated as a results of a previous execution of the process of FIG. 10B.

In one embodiment, the interpretation operation is performed by a PHP interpreter. In another embodiment, the interpretation operation is performed by a modified PHP interpreter such as Grasp.

In one embodiment, during the interpretation, processing logic may include more program files dynamically (processing block 1014), which go through the same source-to-source transformation.

After the interpretation operation has been completed, processing logic generates an execution log (processing block 1015), and processing logic performs symbolic execution (processing block 1016) in a manner well-known in the art.

Next, processing logic annotates ASTs with concrete values (processing block 1017) and applies a bounding process (processing block 1018). In one embodiment, processing logic applies the bounding process of FIG. 6.

After bounding, processing logic annotates the bounded ASTs with concrete values (processing block 1019), selects one expression to complement (processing block 1020), and performs constraint resolution (processing block 1021). In one embodiment, processing logic applies the constraint resolution of FIG. 9. The constraint resolution process produces new input values for further testing.

The following describes a demonstrative example depicting the use of the process of FIG. 10B to perform automated input test generation according to the testing framework disclosed herein.

FIG. 11 shows some sample PHP source code that will be used to demonstrate the techniques described above. Referring to FIG. 11, this code takes a user ID and attempts to authenticate the user to perform other actions; if the user's ID does not appear in the database, the program exits with an error message. This particular code fragment does not use dynamic features, but it still serves to illustrate some of the main points described herein. In the presence of dynamic features, the concrete values of interpreted strings are simply recorded and those values are used in the constraint generation and resolution set forth above.

As in the case of standard concolic testing, the program is instrumented in order to execute it both concretely, using the standard runtime system, and symbolically. Symbolic execution takes place at the level of a RAM machine, which means that maps from names to symbolic locations are maintained, and a map from symbolic locations to symbolic values is maintained. By doing so, the analysis does not require any off-line alias analysis. The testing framework described herein records a symbolic constraint for each conditional expression that appears in the program's execution.

On the first iteration, the testing framework executes the program without providing any input parameters. When it encounters the isset conditional on line 10, it records the constraint:

$$\text{GET[userid]} \in \emptyset$$

and the program reaches line 21 and exits. Each of the constraints it gathers is expressed as a language inclusion constraint. For the next run, the testing framework inverts this constraint:

$$\text{GET[userid]} \notin \emptyset \Leftrightarrow \text{GET[userid]} \in \Sigma^*$$

finds ∈, the empty string, as the shortest value in Σ*, and reruns the program with the_GET parameters "userid" set to "". This illustrates a useful feature of the approach described here: there is no need to specify interfaces for the PHP programs that are test, nor is a static analysis needed to infer them. When the program expects a parameter that the testing framework does not supply, that parameter will show up in a constraint that, when inverted, will cause the parameter to be included in the next run. This is not only the case explicit conditionals check whether variables are set, but also when any variable is used that has not been initialized.

On the second iteration, the framework gathers the constraints:

$$[\text{GET[userid]} \in \Sigma^*, \text{GET[userid]} \in \{\in\}]$$

again reaches line 21 and exits. For this example, it is assumed that the condition on line 12 holds. The testing framework inverts the last constraint to perform a depth-first search of the program's computation tree:

$$[\text{GET[userid]} \in \Sigma^*, \text{GET[userid]} \notin \{\in\}] \Leftrightarrow \text{GET[userid]} \in \Sigma^+$$

Again, the testing framework selects some shortest value in $\Sigma^+$, in this case 'a.'

On the third iteration, the framework gathers the constraints:

$$[\text{GET[userid]} \in \Sigma^*, \text{GET[userid]} \notin \{\in\}, 00.\text{GET[userid]} \notin L(A_{00\,[0-9]+})]$$

Inverting constraints such as the last one here requires techniques beyond those that have been proposed in the past because this constraint includes a string operation, viz. concatenation.

Constraint Resolution

The problem of satisfiability of word equations with regular constraints is PSPACE-complete, which is well known in the art. However, the constraint language disclosed above is more expressive than this because nondeterministic rational relations, expressed as FSTs, are included and many classes of language constraints are undecidable. Consequently, not every constraint in the language of constraints that may be generated can be solved precisely. However, a benefit of the concolic testing framework is that the constraint resolution algorithm can be incomplete or even wrong, and no false positives will be reported. In one embodiment, the common case in which input variables appear is only on the left-hand side of each language inclusion constraint.

As stated above, in one embodiment, finite state transducers (FSTs) are used to invert string operations. FIG. 12A shows an FST the represents the curried function "00.", i.e., the function that prepends the string "00" to its argument. Referring to FIG. 12B, the first two transitions each read nothing and output "0" and the third transition outputs whatever it reads. FSTs can be inverted by swapping the input symbol with the output symbol on each transition. FIG. 12B shows the FST inverted.

FIG. 13A shows an FSA representation of the language of strings that match the regular expression on line 24 of FIG. 11. Because the regular expression does not have anchors ('^' for "beginning of the string" and '$' for "end of the string"), the pattern only appears somewhere in the string, as the FSA shows. Because the FST in FIG. 12B represents the inverse of prepending "00," this FST can be applied to the FSA in FIG. 13A to produce the FSA in FIG. 13B. The language of this FSA represents the language of values for GET[userid] for which the conditional expression on line 24 will evaluate to true. As before, the language of this FSA is intersected with the languages of the other FSAs for the same variable in order to find the language of values that will cause the program to take a new path in its computation tree. A new value, such as "0", can then be selected for the userid GET parameter.

Test Oracles

In order to be useful, automatic test input generation requires a test oracle that will give feed back on each execution of the program. In one embodiment, this feedback takes the form of pass or fail. In one embodiment, at least two kinds of oracles are used. First, security testers often see whether the input causes the web browser to pop up an alert window. If it does, this indicates a cross-site scripting (XSS) vulnerability. Second, testers check to see whether corresponding pages of sites written to be configured for multiple natural languages have the same structure. If they do not, this indicates that some data is missing in one of the languages. These test oracles are available for the testing framework described herein.

Grasp is a modified version of the PHP interpreter that performs character-level tainting, and allows security policies to be defined on strings based on tainting. A typical example of such a policy defines SQL injection attacks as SQL queries in which characters in tokens other than literals are tainted, or more generally, only syntactically confined substrings are tainted. Given the SQL grammar (CFG) G=(V, Σ, S, R) and a query string $\sigma = \sigma_1 \sigma_2 \sigma_3 \in \Sigma^*$, $\sigma_2$ is syntactically confined in $\sigma$ if there exists a sentental form $\sigma_1 X \sigma_3$ such that $X \in V$ and $S \Rightarrow^*_G \sigma_1 X \sigma_3 \Rightarrow^*_G \sigma_1 \sigma_2 \sigma_3$. In another embodiment, other taint-based policies, such as the policy that tainted strings in the web application's output document must not invoke the clients JavaScript interpreter, are used. This is a less heuristic approach to finding XSS vulnerabilities.

An advantage to using taint-based policies such as the ones described above is that an attempt to generate inputs that will result in failing runs and so bugs can be discovered. In the case of SQL injection vulnerabilities, prior to each call to the query function in the database API, an implicit SQL conditional is applied to the string value of the query. That conditional does not appear in the program or in the execution of the program; it is simply recorded as a constraint in our symbolic execution. The constraint specifies that substrings in the query from user input are syntactically confined. In order to invert this constraint, a transducer is constructed that inverts the operations that constructed the query string, just as before. The image of the SQL CFG is constructed over that transducer. In one embodiment, the image of a context-free language represented by a CFG over an FST is constructed using an adaptation of the CFL-reachability algorithm to construct the intersection of a CFG and an FSA.

The structure of the resulting CFG G' corresponds to the structure of the SQL CFG such that for a PHP variable v whose value is used to construct the query string, a sub grammar $G_v$ is extracted from G' such that $v \in L(G_v)$. The SQL predicate checks whether symbolically, all possible values for v are safe based on the structure of $G_v$. In the case of the running example, this predicate does not hold. Rather than inverting it by taking its complement, extracted from $G_v$ $G'_v$, the grammar for values for v where $L(G_v) \subset L(G'_v)$ and every string in $L(G'_v)$ represents an attack input. $G'_v$ can be constructed because it is based on the structure of $G_v$.

To resolve the constraints on v, the intersection of $L(G'_v)$ with the intersection of the other regular languages that bound v's range is taken. The result is a CFG, and finding a word in the language of a CFG can be done in linear time. Such a word will then be supplied as input for the next test run, and if it indeed violates the security policy, the runtime system will catch it. Because the intersection of two CFGs cannot be constructed in general, in one embodiment, only one SQL constraint is handled on each variable at a time. In the case of the running example, the result of resolving the SQL predicate is too involved to show in a meaningful picture, but the algorithm will produce a string like "0' OR'a'='a," which will result in an attack.

Embodiments of the present invention has a number of advantages, including, but not limited to being fully automated; not requiring an interface specification; handling string operations; detecting injection vulnerabilities; and generating test inputs for scripting languages, which may utilize general meta-programming.

An Example of a Computer System

Figure 14:
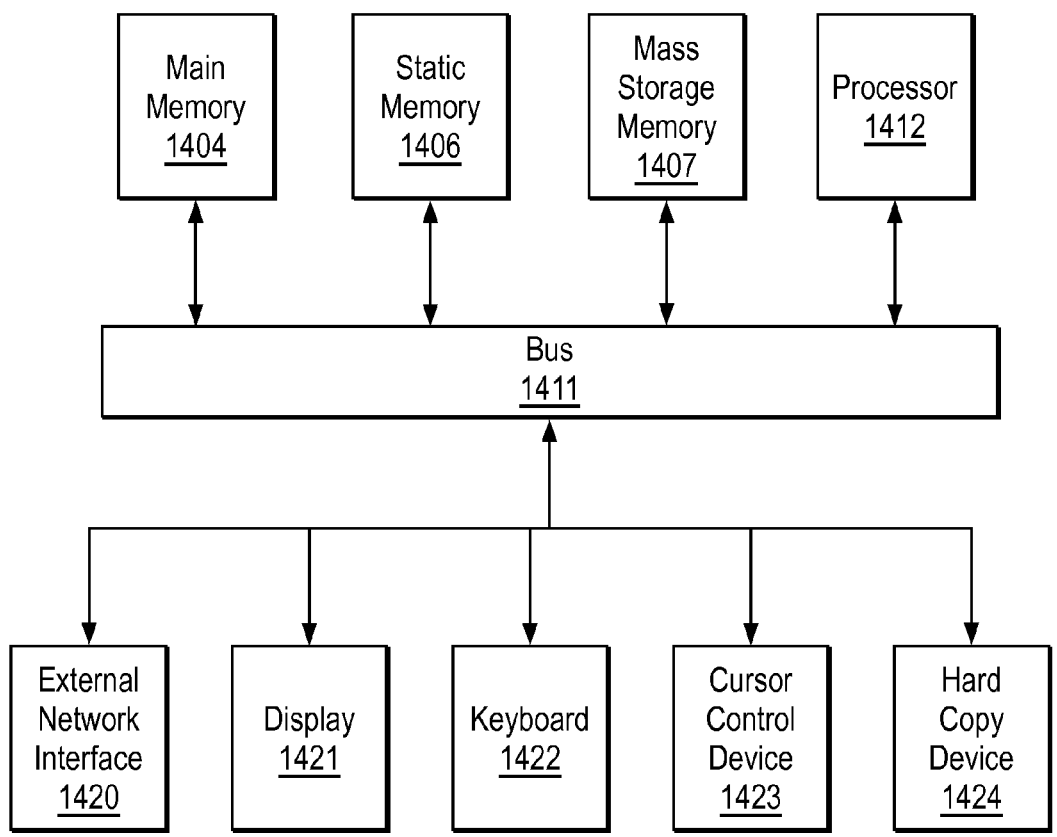
FIG. 14 is a block diagram of one embodiment of a computer system.

FIG. 14 is a block diagram of an exemplary computer system that may perform one or more of the operations described herein. Referring to FIG. 14, computer system 1400 may comprise an exemplary client or server computer system. Computer system 1400 comprises a communication mechanism or bus 1411 for communicating information, and a processor 1412 coupled with bus 1411 for processing information. Processor 1412 includes a microprocessor, but is not limited to a microprocessor, such as, for example, Pentium™, PowerPC™, Alpha™, etc.

System 1400 further comprises a random access memory (RAM), or other dynamic storage device 1404 (referred to as main memory) coupled to bus 1411 for storing information and instructions to be executed by processor 1412. Main memory 1404 also may be used for storing temporary variables or other intermediate information during execution of instructions by processor 1412.

Computer system 1400 also comprises a read only memory (ROM) and/or other static storage device 1406 coupled to bus 1411 for storing static information and instructions for processor 1412, and a data storage device 1407, such as a magnetic disk or optical disk and its corresponding disk drive. Data storage device 1407 is coupled to bus 1411 for storing information and instructions.

Computer system 1400 may further be coupled to a display device 1421, such as a cathode ray tube (CRT) or liquid crystal display (LCD), coupled to bus 1411 for displaying information to a computer user. An alphanumeric input device 1422, including alphanumeric and other keys, may also be coupled to bus 1411 for communicating information and command selections to processor 1412. An additional user input device is cursor control 1423, such as a mouse, trackball, trackpad, stylus, or cursor direction keys, coupled to bus 1411 for communicating direction information and command selections to processor 1412, and for controlling cursor movement on display 1421.

Another device that may be coupled to bus 1411 is hard copy device 1424, which may be used for marking information on a medium such as paper, film, or similar types of media. Another device that may be coupled to bus 1411 is a wired/wireless communication capability 1425 to communication to a phone or handheld palm device.

Note that any or all of the components of system 1400 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for generating test inputs for applying concolic testing in a program, the method comprising:
   receiving a program;
   performing a source-to-source transformation of the program;
   performing interpretation on the program based on a set of test input values;
   symbolically executing the program;
   recording a symbolic constraint for each of one or more conditional expressions encountered during execution of the program further comprising;
   for each variable occurrence in a Boolean control expression,
   creating a copy of the expression and setting all other variable occurrences in the expression to their concrete values from the execution, thereby
   generating a set of expressions where each expression in the set has only a single variable occurrence and each subexpression that does not depend on that variable is replaced with its concrete values; and including
     analyzing a string operation in the program to identify one or more possible execution paths,
     generating symbolic inputs representing values of variables in each of the conditional expressions as a numeric expression and a string constraint including generating constraints on string values by modeling string operations using finite state transducers (FSTs) and supplying values from the program's execution in place of intractable sub-expressions,
     analyzing string operations in the program using the FSTs, wherein the FSTs represent library string functions, and
     resolving control dependencies by recording a stack trace at a beginning of a function call, wherein functions that called the function are to be added to a set of functions to be analyzed; and
   generating new inputs to drive the program during a subsequent iteration based on results of solving the recorded string constraints.

2. The method defined in claim 1 wherein the test input values are dynamically generated input strings based on symbolic string constraints and concrete values gathered from executions of the program.

3. The method defined in claim 2 wherein the input strings are test cases for applications that cover string- and array-centric operations.

4. The method defined in claim 3 wherein the test cases achieve a designated code-coverage metric.

5. The method defined in claim 4 wherein the code-coverage metric is one of a group consisting of: branch coverage and bounded path coverage.

6. The method defined in claim 1 wherein generating, based on results of solving of the recorded string constraints, new inputs to drive the program during a subsequent iteration comprises selecting from an expression from a list to invert and discarding expressions following the expression in the list.

7. The method defined in claim 1 wherein generating symbolic inputs comprises generating a string constraint on one variable in an expression by solving the expression against a constraint.

8. The method defined in claim 1 further comprising replacing one symbolic expression by a concrete value when the one symbolic expression becomes non-linear.

9. The method defined in claim 1 further comprising using the FSTs for solving the constraints for input variables by inverting the FSTs.

10. The method defined in claim 1 wherein modeling string operations using FSTs comprises computing expressions in the program by considering only one variable occurrence per expression at a time.

11. The method defined in claim 1 further comprising:
    identifying a point of possible failure in the program; and
    computing a backward slice from the point of possible failure, and wherein constraints are only recorded from the backward slice.

12. The method defined in claim 11 further comprising adding all functions in which points of possible failure occur to a set of functions to be analyzed.

13. A method for generating test inputs for applying concolic testing in a program, the method comprising:
    receiving a program;
    performing a source-to-source transformation of the program;
    performing interpretation on the program based on a set of test input values;
    symbolically executing the program;
    recording a symbolic constraint for each of one or more conditional expressions encountered during execution of the program further comprising;
    for each variable occurrence in a Boolean control expression,
    creating a copy of the expression and setting all other variable occurrences in the expression to their concrete values from the execution, thereby
    generating a set of expressions where each expression in the set has only a single variable occurrence and each subexpression that does not depend on that variable is replaced with its concrete values; and including
      analyzing a string operation in the program to identify one or more possible execution paths, and generating symbolic inputs representing values of variables in each of the conditional expressions as a numeric expression and a string constraint including generating constraints on string values by modeling string operations using finite state transducers (FSTs) and supplying values from the program's execution in place of intractable sub-expressions; and generating new inputs to drive the program during a subsequent iteration based on results of solving the recorded string constraints;

identifying a point of possible failure in the program, wherein the point includes a point where an API function is called to send a query to a database; and computing a backward slice from the point of failure, and wherein constraints are only recorded from the backward slice;

adding all functions in which these points occur to a set of functions to be analyzed, wherein adding all functions comprises:

resolving control dependencies by recording a stack trace at a beginning of a function call, and adding functions that called the function to the set of functions to be analyzed.

14. The method defined in claim 13 wherein resolving control dependencies comprises examining symbolic values and determining where branches terminate a function call, and further wherein adding those functions to the set of functions.

15. The method defined in claim 1 further comprising checking string values against one or more existing policies to prevent SQL injection attacks.

16. The method defined in claim 15 wherein at least one security policy classifies, as tainted, any SQL query in which characters in tokens are non-literals, and the method includes flagging an error if such a query is identified.

17. The method defined in claim 15 wherein at least one security policy classifies, as tainted, strings in an output document of a web application that invoke a JavaScript interpreter of a client, and the method includes flagging an error if such a string is identified.

18. The method defined in claim 13 wherein recording a constraint results in selective recording of constraints for scaling beyond single functions.

19. The method defined in claim 13 wherein the program is written in a scripting language.

20. The method defined in claim 19 wherein the scripting language is part of a web application.

21. The method defined in claim 19 wherein the scripting language is PHP.

22. A non-transitory computer readable storage medium having instructions stored thereon which, when executed by a system, causes the system to perform a method for generating test inputs for applying concolic testing in a program; the method comprising:

receiving a program;

performing a source-to-source transformation of the program;

performing interpretation on the program based on a set of test input values;

symbolically executing the program;

recording a symbolic constraint for each of one or more conditional expressions encountered during execution of the program further comprising;

for each variable occurrence in a Boolean control expression, creating a copy of the expression and setting all other variable occurrences in the expression to their concrete values from the execution, thereby generating a set of expressions where each expression in the set has only a single variable occurrence and each subexpression that does not depend on that variable is replaced with its concrete values; and including analyzing a string operation in the program to identify one or more possible execution paths, generating symbolic inputs representing values of variables in each of the conditional expressions as a numeric expression and a string constraint including generating constraints on string values by modeling string operations using finite state transducers (FSTs) and supplying values from the program's execution in place of intractable sub-expressions, analyzing string operations in the program using the FSTs, wherein the FSTs represent library string functions, and resolving control dependencies by recording a stack trace at a beginning of a function call, wherein functions that called the function are to be added to a set of functions to be analyzed; and generating new inputs to drive the program during a subsequent iteration based on results of solving the recorded string constraints.

23. A method comprising:

receiving a web application; and applying concolic testing to the web application using string constraints and a decision procedure for the string constraints, wherein applying the concolic testing comprises, analyzing string operations in the web application using finite state transducers (FSTs), wherein the FSTs represent library string functions, and resolving control dependencies by recording a stack trace at a beginning of a function call, wherein functions that called the function are to be added to a set of functions to be analyzed.

24. The method defined in claim 23 further comprising checking string values against one or more policies to prevent SQL injection attacks and cross-site scripting.

25. A non-transitory computer readable storage medium having instructions stored thereon which, when executed by a system, causes the system to perform a method comprising:

receiving a web application; and applying concolic testing to the web application using string constraints and a decision procedure for the string constraints, wherein applying the concolic testing comprises, analyzing string operations in the web application using finite state transducers (FSTs), wherein the FSTs represent library string functions, and resolving control dependencies by recording a stack trace at a beginning of a function call, wherein functions that called the function are to be added a set of functions to be analyzed.

* * * * *